US008751375B2

(12) United States Patent
Smith et al.

(10) Patent No.: US 8,751,375 B2
(45) Date of Patent: Jun. 10, 2014

(54) EVENT PROCESSING FOR DETECTION OF SUSPICIOUS FINANCIAL ACTIVITY

(75) Inventors: Christopher P. Smith, Charlotte, NC (US); Subramanian Sulur, Charlotte, NC (US); Paul B. Dougherty, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 493 days.

(21) Appl. No.: 12/550,942

(22) Filed: Aug. 31, 2009

(65) Prior Publication Data

US 2011/0055852 A1    Mar. 3, 2011

(51) Int. Cl.
*G06Q 40/00* (2012.01)

(52) U.S. Cl.
USPC ................................. 705/38; 705/35; 705/39

(58) Field of Classification Search
USPC ........................................................... 705/38
See application file for complete search history.

(56) References Cited

U.S. PATENT DOCUMENTS

| 6,119,103 | A  | * | 9/2000 | Basch et al. ................... 705/35 |
| 6,658,393 | B1 |   | 12/2003 | Basch et al. |
| 2002/0059130 | A1 | * | 5/2002 | Cheng et al. .................... 705/37 |
| 2002/0194119 | A1 | * | 12/2002 | Wright et al. ................... 705/38 |
| 2003/0033228 | A1 | * | 2/2003 | Bosworth-Davies et al. .. 705/35 |
| 2004/0024693 | A1 |   | 2/2004 | Lawrence |
| 2005/0055290 | A1 | * | 3/2005 | Bross et al. ..................... 705/31 |
| 2006/0074621 | A1 |   | 4/2006 | Rachman |
| 2008/0191007 | A1 |   | 8/2008 | Keay |
| 2008/0270171 | A1 |   | 10/2008 | Price et al. |
| 2008/0270206 | A1 | * | 10/2008 | Gillum .............................. 705/7 |
| 2008/0270303 | A1 |   | 10/2008 | Zhou et al. |
| 2008/0288382 | A1 |   | 11/2008 | Smith et al. |
| 2009/0125369 | A1 |   | 5/2009 | Kloostra et al. |
| 2010/0100468 | A1 |   | 4/2010 | Spector et al. |

FOREIGN PATENT DOCUMENTS

WO    WO 94/06103    3/1994

OTHER PUBLICATIONS

Gao, Caddie Shijia et al. Conceptual Modelling and Development of an Intelligent Agent-Assisted Decision Support System for Anti-Money Laundering. Proceedings of the 11$^{th}$ Annual Conference of Asia Pacific Decision Sciences Institute Hong Kong, pp. 442-450. 9 pages. Jun. 14-18, 2006.

(Continued)

*Primary Examiner* — Rajesh Khattar
*Assistant Examiner* — Arunava Chakravarti
(74) *Attorney, Agent, or Firm* — Michael A. Springs; Moore & Van Allen PLLC; James C. Edwards (57) ABSTRACT

Event processing for suspicious activity detection is disclosed. Financial events can be detected by receiving data from a plurality of detection channels. The data can optionally be enriched by adding additional details about events. An event or group of events is scored based on pre-defined risk factors and experience, and the resulting score can be compared to a pre-defined threshold. A case for investigation is established when the score is above the pre-defined threshold. Events for which the score is below the pre-defined threshold are sampled to provide the experience for the scoring. Events can be scored by obtaining a plurality of predictors, collecting training data regarding existing cases, and running a logistic regression to obtain weights for the predictors. The likelihood of a case for investigation resulting in a suspicious activity report can then be determined.

12 Claims, 4 Drawing Sheets

(56) References Cited

OTHER PUBLICATIONS

Zhang, Zhongfei Mark et al. "Applying Data Mining in Investigating Money Laundering Crimes." SIGKDD'03 Washington, D.C., USA. Whole document, especially headings 4 and 5. 6 pages. Aug. 24-27, 2003.

Derrig, Ph.D., Richard. "Distinguishing the Forest from the Trees: A comparison of Tree Based Data Mining Methods." 2006 Data Management, Quality, and Technology Call for Papers. 46 pages. Mar. 15-16, 2006.

Wang, Yingfeng et al. "Intelligent Money Laundering Monitoring and Detecting System." European and Mediterranean conference on Information Systems 2008 (EMCIS2008). Al Bustan Rotana Hotel, Dubai. 11 pages. May 25-26, 2008.

Brause, R. et al. "Neural Data Mining for Credit Card Fraud Detection." Proceedings 11th International Conference on Tools with Artificial Intelligence 1999. 4 pages.

Hand, David et al. *Principles of Data Mining*. ISBN: 026208290x. The MIT Press © 2001. Whole document, especially chapters 6, 7, 10, 11, and 13. 322 pages.

Hungarian Intellectual Property Office. Search Report. Applicant: Bank of America Corporation (DW, US). Hungarian Application No. 201006162-0. Filing Date: Aug. 24, 2010. 10 pages.

Hungarian Intellectual Property Office. Written Opinion. Applicant: Bank of America Corporation (DW, US). Hungarian Application No. 201006162-0. Filing Date: Aug. 24, 2010. 8 pages.

Hungarian Intellectual Property Office. Second Written Opinion dated Jun. 13, 2012. Applicant: Bank of America Corporation (DW, US). Singapore Application No. 201006162-0. Filing Date: Aug. 24, 2010. Received Jul. 18, 2012. 10 pages.

Hungarian Intellectual Property Office. Singapore Examination Report dated Jun. 5, 2013. Singapore Application No. 20100616-0. Applicant: Bank of America Corporation (DW, US). Filing Date: Aug. 24, 2010. 8 pages.

Danish Patent & Trademark Office. Singapore Examination Report dated Apr. 8, 2013. Singapore Application No. 201106740-2. Applicant: Bank of America Corporation (DW, US). Filing Date: Sep. 19, 2011. 10 pages. Received: May 28, 2013.

Danish Patent & Trademark Office. Singapore Search Report and Examiner's Written Opinion. Applicant: Bank of America Corporation (DW, US). Singapore Application No. 201106740-2. Filing Date: Sep. 19, 2011. Received Jan. 17, 2013. Date of Written Opinion: Oct. 23, 2012. 26 pages.

\* cited by examiner

EVENT PROCESSING FOR DETECTION OF SUSPICIOUS FINANCIAL ACTIVITY

BACKGROUND

With the use of financial systems, products and the like by terrorists and other criminals to finance and support their activities, governments have promulgated guidelines and regulations to detect and monitor use of such systems and products. Compliance with these governmental guidelines and regulations can impose significant monetary and reputational burdens on financial institutions. Additionally, the financial institution itself may develop internal monitoring standards in order for the officers of the institution to safeguard the institution's assets against theft. Monitoring every transaction for the possibility of illicit or illegal activity can be a difficult task. Additionally, there may also be a need to document investigations and/or why certain actions were taken or not taken or document justification for a certain level of scrutiny placed on various customers.

SUMMARY

The financial crimes event processing solution according to example embodiments of the invention ingests data for a variety of events, including those from anti-money laundering systems, corporate security systems and systems external to the enterprise. The events can be analyzed to determine if a case should be created for investigation due to the possibility of the event being associated with fraudulent activity. In at least some embodiments, event data can be enriched by providing additional detail associated with an event, and by consolidation so that events can be grouped based on common information and scored automatically based on pre-defined risk factors.

In at least some embodiments, financial events can be detected by receiving data from at least one of a plurality of detection channels. The data for an event can optionally be formatted as an event interface record. The data can optionally be enriched by adding additional details about one or more events. An event or group of events can be scored based on pre-defined risk factors and customer experience data, and the resulting score can be compared to a pre-defined threshold. A case for investigation is established when the score is above the pre-defined threshold. Events for which the score is below the pre-defined threshold are statistically sampled to provide at least some of the experience for the scoring.

Events may be grouped into event groups, and a group may be scored. In such a case the score that is compared to the threshold is an event group score. For an event group with a single event the event score and the event group score may be the same. It should also be noted that the establishing of a case for investigation corresponding to an event or group of events may be accomplished by creating a new case, or by appending the event or event group to an existing case. Statistical sampling of an event group for which the score is below the threshold may be accomplished by stratifying the events in the group into a plurality of subgroups. For example, three subgroups may be used. In such a case, one event can be sampled from each group.

In at least some embodiments, the scoring of an event and/or event group is accomplished by obtaining a plurality of predictors including the pre-defined risk factors, collecting training data regarding existing cases, and running a logistic regression to obtain weights for the plurality of predictors. The likelihood of a case for investigation resulting in a suspicious activity report can then be determined. In some embodiments, the scoring of an event and/or event group can alternatively be accomplished using a decision tree methodology.

Embodiments of the invention can be implemented via an instruction execution platform interconnected with various storage media including databases and/or a datamart. Such interconnection may be via a network, such as a corporate intranet, a local area network, or the Internet. A computer program product or computer program products contain computer programs with various instructions that execute or are executed and cause the hardware to carry out, at least in part, the methods and processes of embodiments of the invention.

A system implementing an embodiment of the invention may include a storage medium with event data and a storage medium with case data connected to the instruction execution platform. A storage medium including a datamart can also be connected to the instruction execution platform, wherein the datamart stores the risk factors, the pre-defined threshold, information regarding experience, and other data. These data could also all reside on a single storage medium, or any number of media used in combination. The instruction execution platform and associated media used in carrying out portions of an embodiment of the invention may be referred to herein as an event processor.

DETAILED DESCRIPTION

The following detailed description of embodiments refers to the accompanying drawings, which illustrate specific embodiments of the invention. Other embodiments having different structures and operation do not depart from the scope of the present invention.

As will be appreciated by one of skill in the art, the present invention may be embodied as a method, system, computer program product, or a combination of the foregoing. Accordingly, the present invention may take the form of an entirely hardware embodiment, an entirely software embodiment (including firmware, resident software, micro-code, etc.) or an embodiment combining software and hardware aspects that may generally be referred to herein as a "system." Furthermore, the present invention may take the form of a computer program product on a computer-usable storage medium having computer-usable program code embodied in the medium.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other optical, semiconductor, or magnetic storage device; or transmission media such as those supporting the Internet or an intranet.

The present invention is described below with reference to flowchart illustrations and/or block diagrams of methods, apparatus (systems) and computer program products according to embodiments of the invention. It should be understood that each block of the flowchart illustrations and/or block diagrams, and combinations of blocks in the flowchart illustrations and/or block diagrams, can be implemented by computer program instructions and may involve actions taken with respect to stored input and/or the creation of stored output. These computer program instructions may be provided to a processor of a general purpose computer, special purpose computer, or other programmable data processing apparatus to produce a machine, such that the instructions, which are executable and execute via the processor of the computer or other programmable data processing apparatus or platform, create means for implementing the functions/acts specified in the flowchart and/or block diagram block or blocks. The terms "information" and "data" may be used interchangeably herein with respect to describing stored input and/or output.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

Embodiments of the present invention are disclosed, by way of example, as a tool used in a financial institution to determine risk, and record details in connection with financial events that may constitute fraudulent activity. It cannot be overemphasized that this environment is illustrated as an example only, and an embodiment of the invention can be used in any kind of business, non-profit organization, or government organization. With respect to the example of a bank or financial institution, the term "bank" or the synonymous term "financial institution" and any similar terms are used herein in their broadest sense. Financial institutions that process transactions of the types discussed can include stock brokerages, credit unions, and other types of institutions which are not strictly banks in the historical sense. The term "financial institution" refers to an institution that acts as an agent to provide financial services for its customers or members. Financial institutions generally, but not always, fall under financial regulation from a government authority. Financial institutions include, but are not limited to, banks, building societies, credit unions, stock brokerages, asset management firms, savings and loans, money lending companies, insurance brokerages, insurance underwriters, dealers in securities, and similar businesses. The use of terms such as bank, "financial institution" or "franchise" herein is meant to encompass all such possibilities.

The financial crimes event processing system according to example embodiments of the invention ingests data for a variety of events, including data from anti-money laundering system, corporate security systems, financial accounts systems and systems external to the franchise. Event data be enriched by providing additional detail about the event, and events can be consolidated so that events are grouped based on common information and scored automatically based on predefined risk attributes. These risk attributes can include experience information automatically retrieved from a case management system so that the presence of prior cases can contribute to a score as well. Event group scores are ranked, and groups with scores above a pre-determined threshold correspond to cases for investigation.

Event groups with scores below the above-described threshold can be stratified for random sampling. Randomized samples can be taken from such groups, with the size of the sample being determined in advance based on the sample size needed for statistical validity during a model validation cycle. Randomly sampled event groups can be submitted as cases, and these are used to determine if the criteria and thresholds used to create the events are strongly associated with suspicious activity reports. The random samples can be used to identify the extent to which false negatives are present within event detection channels, and if scenario tuning is needed. User interfaces can enable the maintenance of the risk scoring attributes, the scores, the case creation threshold, and the sample proportions.

According to some embodiments, processing and tracking the status of events generated from various event detection channels from the time an unusual activity associated with a party, account and/or transaction is detected to the final disposition of the event can be accomplished. Event data can be formatted for input using a format referred to herein as an event interface record (EIR). EIRs are verified for data quality, tagged, and enable systematically looking for missing data elements using key identifiers provided within the EIR. As previously mentioned, events can be consolidated into groups based on account relationships. Cases ultimately generated for investigation in example embodiments are made available to a management of cases application for final disposition. The case decision outcome is made available to an event processor for case analysis.

The process uses risk factors and corresponding weights, lists of known entities, and prior customer experience data in assigning risk score for all events associated with an account. The aggregated and final risk score is then compared against a case threshold to determine if a case for investigation will be generated.

Figure 1:
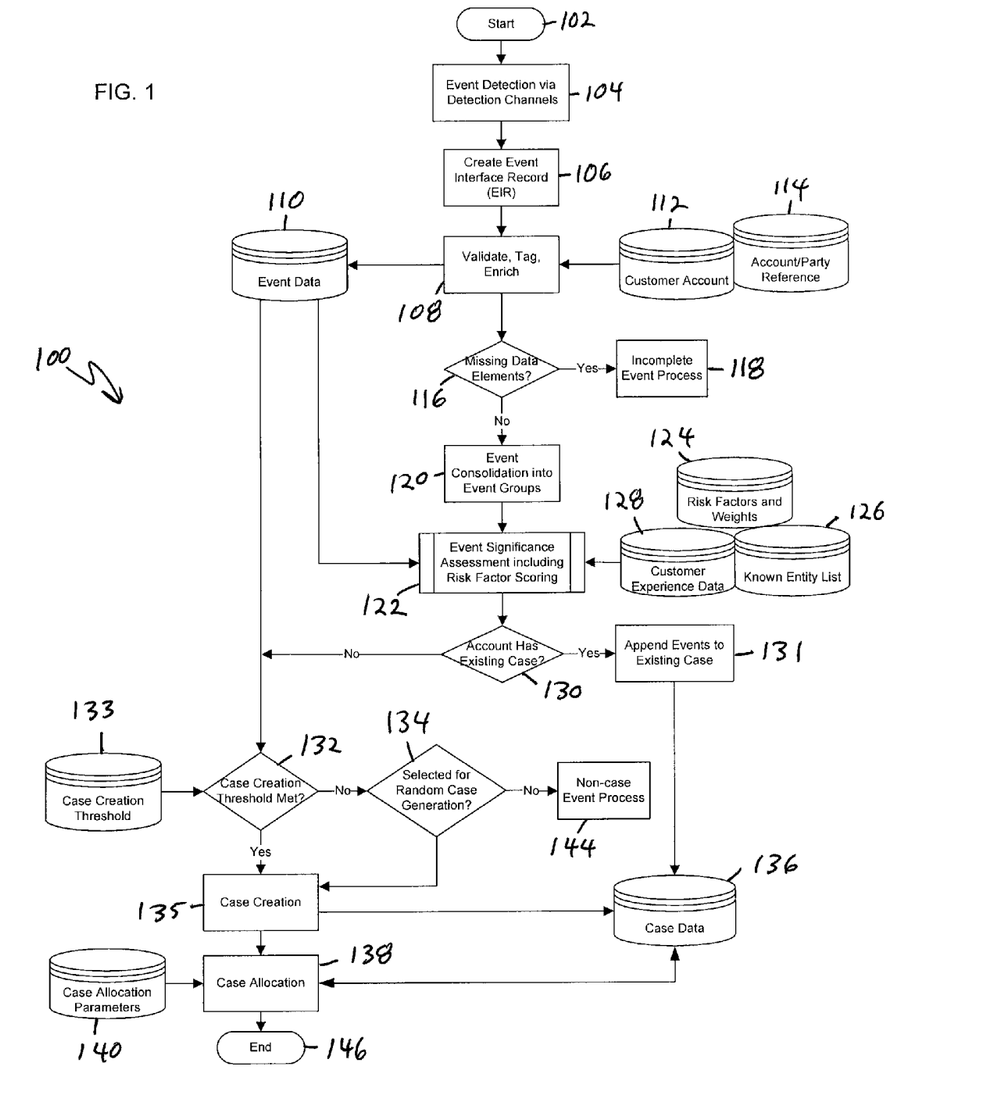
FIG. 1 is a flowchart illustrating the overall process of at least one example embodiment of the present invention.

FIG. 1. is a flowchart illustrating the overall process of an example embodiment of the present invention. FIG. 1 also illustrates how various data are used in carrying out the process. Like most flowchart illustrations, FIG. 1 illustrates process 100 as a plurality of process and/or sub-process blocks presented in sequence. Various data that are input and/or output from the process are schematically shown as storage media. Process 100 begins at block 102. At block 104, an event or events is or are detected through one of various detection channels. Detection channels are interfaces to processes or business units that generate events based on transaction activities matching a predefined pattern. Records generated meet certain risk based criteria for further processing to determine if the event merits the generation of a case for investigation. Although detection channels have varying data and record formats within their own processing environments, the data being passed on to the event processor of an embodiment of the invention would normally be formatted as an EIR. At block 106 of FIG. 1, the EIR is created. The EIR in this embodiment contains event, account and account consolidation information, information regarding the detection channel that generated the event, and a description of the activity. The EIR can be staged by the detection channels and made available to the event processor. The EIR in this example can be in one of the following file formats, although other formats could in general be used: XML; Excel™ spreadsheet (XLS); comma or tab separated values; or a flat file with delimiters in between distinct blocks of information.

Still referring to FIG. 1, validation, tagging and data enrichment take place at block 108. An event is tagged and assigned a unique system-generated identifier when the event gets loaded into the event processor. Events are then staged in event database 110. Data quality checking is performed to ensure that required data elements are available and are valid. An attempt is made, for events that do not have account consolidation information, to locate the missing data elements from the customer account database 112 or using historical account/party reference information 114 to locate the relevant account. At block 116, a determination is made as to whether, after attempts to locate missing information, there are still missing data elements in the EIR. If so, an incomplete event process, 118, is undertaken. Otherwise, process 100 proceeds to block 120, where events that have all the necessary data elements are grouped based on account relationships. Grouped events are assigned a system generated unique identifier. An event group may contain only one event or multiple events. The incomplete events process, 118, provides analysts the capability of reviewing events with missing data elements through a graphical user interface. Required data elements may be added if available. Modified records are flagged and staged in a repaired events queue. In the next event processor scheduled cycle run, the system will detect these modified event records and so that they can be included in the process. In effect, the modified records form a detection channel.

Continuing with FIG. 1, event significance assessment 122 is carried out using risk factor scoring. Grouped events are risk scored based on risk factors and weights 124, known entity list 126, and customer experience data 128. At this point, the weights for all sources have been previously established using a robust means, such as logistic regression or decision tree methodology, at various levels of aggregation, such as event, event group, party, and account level. The individual risk factors are created such that they represent the incremental probability that the risk factor, if present, contributes to the likelihood of the nature of the event group necessitates the filing of a suspicious activity report by an investigator. The total score of each event within an event group is summed together and, after setting an appropriate threshold for case-worthiness, is used in making a decision as to whether a case for investigation will be programmatically generated.

A risk factor in example embodiments of the invention is a customer, account or event level attribute that is tied to a business rule or scenario. A risk factor is assigned a weight relative to the degree of risk associated with the attribute. The weight can be applied to individual events (event level weight) or to a group of events (event group level weight). Each risk factor has an associated, specific action. For example, if the action is "none," the weight of the risk factor will be included in the aggregation in determining the risk score. If the action is "suppress," the weight of the risk factor will be excluded from the aggregation in determining the risk score. Further details on risk factor calculations used with embodiments of the invention are discussed with reference to FIG. 2 and FIG. 3.

In the example embodiments, known entity list 126 of FIG. 1 is a list of accounts that have attributes indicating whether to systematically suppress the event or generate a case record regardless of the outcome of the final risk score. Customer experience data 128 includes but is not limited to customer transaction history, prior suspicious activity report (SAR) information, currency transaction report (CTR) filings, and prior cases for investigation. A CTR filing and a SAR are both standard filing forms specified by government regulations in the United States.

In example embodiments, each event is verified for the account's existence in the known entity list. If the account exists in the list, the action taken depends on the attribute associated to the account. If the account exists in the known entity list with an attribute to "create a case", the event group for the account will be programmatically assigned a final risk score that meets the threshold to generate a case record. If the account exists in the known entity list with an attribute to "suppress", the following actions are taken: if the attribute specifies suppress at the event level, the particular event will be excluded but the other events within the event group will be included in the aggregation when determining the risk score; if the attribute specifies suppress at the event group level, all events in the event group will be excluded from the aggregation when determining the risk score. The risk factor weight for each event is retrieved from the risk factor database using a risk factor code that is associated with the event. The weights of each event associated within an event group are aggregated. The sum of the weights is the risk score.

Returning to FIG. 1, at block 130, a determination is made as to whether the account to which the event group pertains has an existing case for investigation on file. If so, all the events within the event group will be appended to the existing case at block 131. At block 132, a determination is made as to whether the risk score generated meets a pre-determined threshold for automatically creating a case for investigation. The threshold value is stored as shown at block 133. If the risk score does not meet the specified threshold, a determination is made at block 134 as to whether a case will be generated randomly. At block 135, a case for investigation is systematically generated for event groups that meet the risk score threshold or events that did not meet the threshold but were selected for random case generation. Case records are staged in case database 136. Statistical sampling of an event group for which the score is below the threshold may be accomplished by stratifying the events in the group into a plurality of subgroups. For example, three subgroups may be used. In such a case, one event can be sampled from each group.

Continuing with FIG. 1, a case interface record file is also created based on a standard record format. The case interface record contains event information, associated accounts and transaction data that may be involved in a case. The case interface record can be staged by the event processor and made available to the case management application. Additionally, in this example embodiment, the case interface record can be in one of the following file formats, although other formats may generally be used: XML; Excel™ spreadsheet (XLS); comma or tab separated values; or a flat file with delimiters between distinct blocks of information. Cases are allocated at block 138 based on predefined sets of parameters 140. These parameters take into consideration the available resources and current queue of outstanding cases. Selection parameters include but are not limited to the range of the out of threshold risk score and the risk factor(s). Case allocation is the assigning of a case to a specific team of investigators. In some institutions, some investigation teams handle specific types of cases. The case assignment logic of the system takes into consideration the risk factors associated with the event or group of events and the staffing level of each investigation team.

Events that do not become cases for investigation in the process of FIG. 1 can be manually reviewed through a graphical user interface at block 144. Analysts can flag an event or event group for case creation for the next scheduled event processor cycle run. Again, in effect, this interface becomes another detection channel for the event processor. Process 100 of FIG. 1 ends at block 146.

Figure 2:
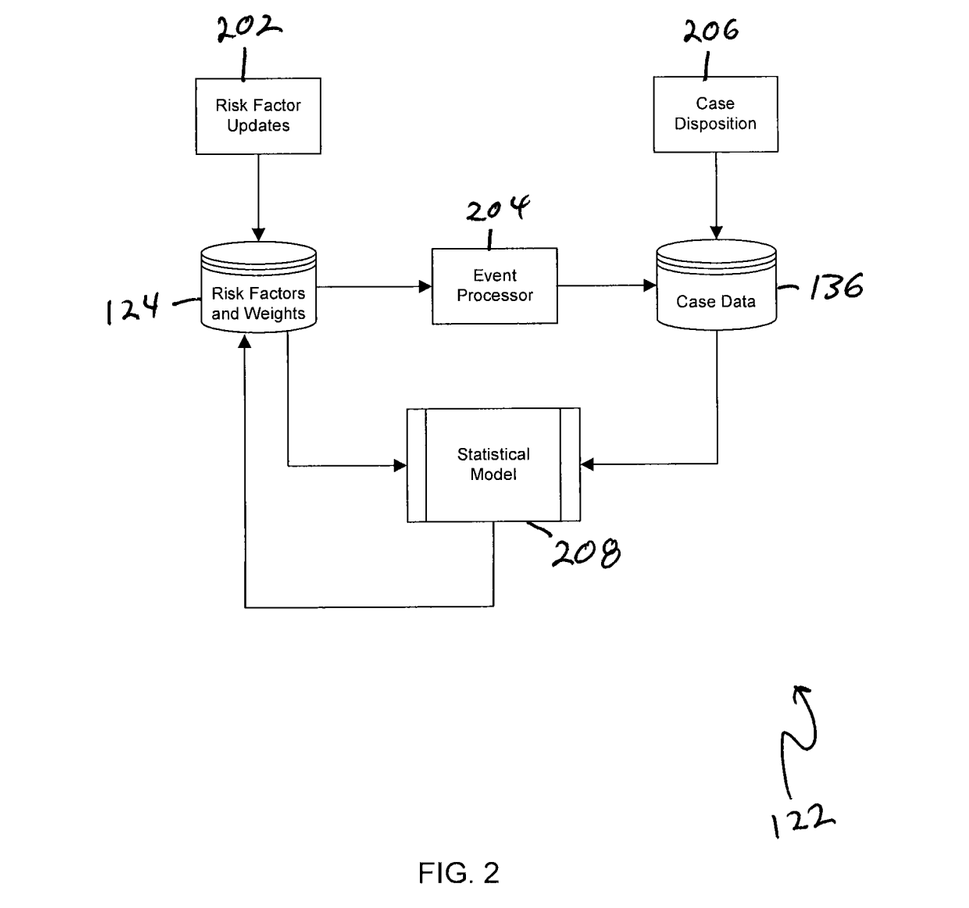
FIG. 2 is a combination flowchart and system diagram illustrating a scoring process according to at least some embodiments of the present invention.

FIG. 2 is a combination flowchart and system block diagram that illustrates further details of the event significance assessment 122 referred to in FIG. 1. To support process 122 of FIG. 2, extensive research is done to determine transaction activity patterns, emerging risks, scenarios, and the like in order to determine appropriate risk factors. Risk factor updates 202 and fed to the risk factors and weights database 124. Risk factors are then incorporated into the monitoring and surveillance of customer activities by event processor 204. When a case for investigation is generated, the risk factor(s) identified with the customer transactions and activity is/are recorded. Risk factors can include a wide variety of characteristics, and can be tailored for the specific enterprise making use of an embodiment of the invention. Examples of some typical risk factors include, but are not limited to: customer cash deposits that meet the threshold for currency transaction reporting (CTR) to government agencies; aggregation of cash deposits by a customer which fall consistently just below the CTR threshold; a party involved in a transaction is an employee of the bank or a company related to the bank; the owner of the account is a political figure; high velocity of incoming and outgoing movement of funds through electronic wire funds transfer; whether the observed behavior is within the normal range of behavior observed for the customer over some period of time; the customer has been associated with previous cases that were not reported within a SAR; or the transaction involves the flow of money through the bank (via wire, for example) to a high risk country.

Still referring to FIG. 2, information regarding the SAR/No SAR outcome of cases is collected at block 206. When a case is closed, the final decision is either: a SAR is filed; or a SAR is not filed. For each event associated with a case, the number of instances that a risk factor was a contributing factor in the creation of the case is collected. This information is all stored in the case database, 136. Statistical model process 208 is run using the risk factors, existing weights, and case data to calculate new weights, which are then fed back in to database 124. In this way, previous cases, including those randomly sampled, provide the experience for scoring going forward. The statistical modeling may be performed on a computer system separate from the event processor, or may be performed by the event processor itself.

Figure 3:
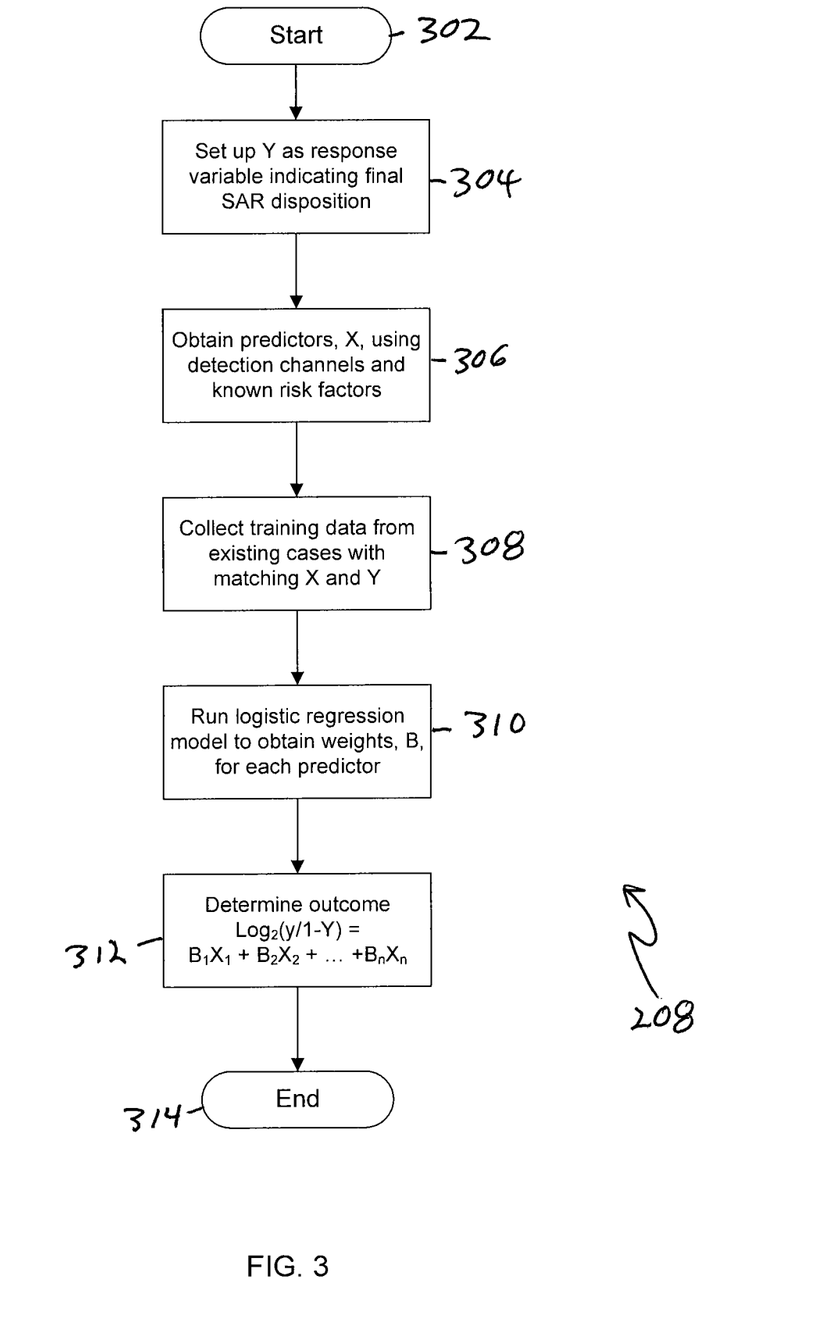
FIG. 3 is a flowchart illustrating further detail of the scoring process according to at least some embodiments of the present invention.

FIG. 3 illustrates the details for statistical modeling process 208 of FIG. 2. Process 208 begins at block 302. In example embodiments, risk factor weight is determined based on the probability of a case for investigation turning in to a suspicious activity report (SAR). The final disposition of a case, whether a SAR is filed, is collected as the response (dependent variable) Y at block 304, and detection channels and risk factors are established as predictors X at block 306. At block 308, training data from existing SAR/No SAR cases with matching Y and X is collected. A logistic regression model is built and run at block 310 for the prediction of the probability of occurrence of a SAR. This model provides weights B for each predictor and two-way interaction of predictors based on each predictor's significance level and contribution to the SAR/No SAR result. The outcome is determined at block 312 using the formula:

$$\mathrm{Log}_2(y/1-y) = XB = B_1X_1 + B_2X_2 + \ldots + B_nX_n,$$

where Outcome$^{XB}$ indicates the odds of SAR vs. No SAR. Statistical modeling process 208 ends at block 314. In some embodiments, the well-known SAS™ statistical tool can be used for scenario creation and tuning.

When business need dictates, scenario cut-off thresholds (business rules) for separating SAR/No SAR decisions or case decisions can be determined without the statistical modeling formula. Scoring can be accomplished using a decision tree (chaid, cart) methodology. Such a methodology uses a 0/1 decision as a final destination, and separates training data by distance to a centroid of a distribution of decisions using a linear cut-off rule. In such a case, the separation dimension (number for cutoff decision) is determined by the acceptance ratio of a false positive rate to a false negative rate, or by business requirements. Such business requirements might be dictated by necessity. An example would be to force splits by line of business (LOB) for a given scenario with thresholds determined at the LOB level, regardless of the statistical association of LOB with the SAR outcome.

Figure 4:
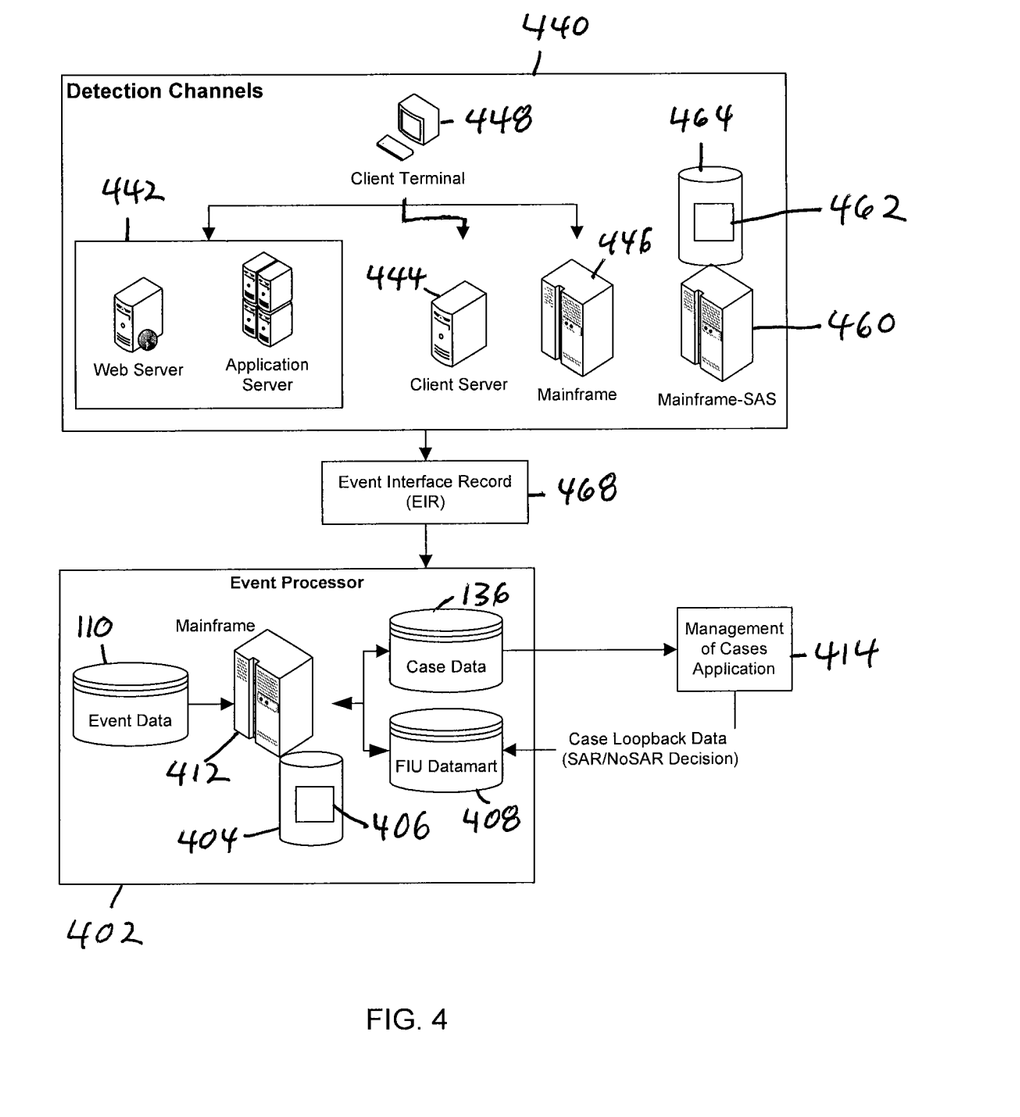
FIG. 4 is a system block diagram of an example system and operating environment of an embodiment of the present invention.

FIG. 4 is a system block diagram illustrating a system and operating environment for implementing example embodiments of the invention. Event processor 402 of system 400 includes a fixed storage medium, illustrated graphically at 404, for storing computer program product code 406 to enable the use of an embodiment of the invention. Other storage media are shown as part of event processor 402. These media house the event database, 110, the case database, 136, and financial intelligence unit (FIU) datamart 408. Computer program product 406 includes a computer program or programs with instructions or code for carrying out portions of the methods of embodiments of the invention. Instruction execution platform 412 of FIG. 4 is a typical mainframe computer system including a processor and supporting circuitry and can execute the appropriate instructions as is known in the art.

A datamart as used with example embodiments of the invention is a subset of an organizational data store, usually oriented to a specific purpose or major data subject, which may be distributed to support business needs. A datamart can be an analytical data store designed to focus on specific business functions for a specific unit within a financial institution. In this example, datamart 408 focuses on the business functions of a financial intelligence unit (FIU) within a financial organization. Such a financial intelligence unit is often maintained by a large bank or similar enterprise to provide information developed through the use of analytics. Analytics is a term used in business for the study of business data using statistical analysis in order to discover and understand historical patterns. In the case of datamart 408 of FIG. 4, the datamart can house and maintain information including, but not limited to, historical case/no case decisions, suppression lists, customer experience information, the risk factors and weights data, records of randomly selected events, thresholds, relationship data, and historical records of SARs. Case data can loopback from the case database to the FIU datamart, through application 414, which can be used by analysts to manage cases. Looping back refers to current decisions becoming historical data for use in determining weights and other information used for future decisions.

Still referring to FIG. 4, example detection channels 440 include Web and application servers 442, which may be used for on-line services, other client server applications, 444, and other main frame applications, 446. Client applications at client terminal 448 typically interact with these event detection channels. Statistical modeling can be performed on a mainframe computer system or instruction execution platform, such as mainframe 460, which in the example, runs the previously mentioned. SAS statistical software. A portion, 462, of the computer program product code that implements an embodiment of the invention can reside at mainframe system 460 on storage medium 464.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. Additionally, comparative, quantitative terms such as "above", "below", "less", "greater", are intended to encompass the concept of equality, thus, "less" can mean not only "less" in the strictest mathematical sense, but also, "less than or equal to."

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A computer-implemented method of processing financial events, the method comprising:
   detecting, using a computing device processor, a plurality of financial events by receiving data associated with the events from a plurality of detection channels, wherein the detection channels include an anti-money laundering system, a financial institution security system and a financial institution accounts system;
   formatting, using a computing device processor, the data for each of the financial events into an event interface record;
   enriching, using a computing device processor and at least one database, the data corresponding to the plurality of financial events, wherein enriching comprises locating, in the least one database, data elements that are determined to be missing in the event interface record based on key identifiers and adding the data elements to the event interface record;
   consolidating, using a computing device processor, the financial events into a plurality of financial event groups, wherein each financial event group comprises one or more financial events and each of the financial events in a financial event group are related based on a financial account relationship;
   scoring, using a computing device processor, each of the financial events in each of the financial event groups based on pre-defined risk factors and customer experience data, wherein customer experience data includes transaction history related to one or more customers associated with the financial event, prior suspicious activity report (SAR) history associated with the one or more customers and prior cases investigated associated with the one or more customers;
   summing, using a computing device processor, the scores of each of the financial events with a financial event group to result in a financial event group score; and
   comparing, using a computing device processor, the financial event group scores to a pre-defined threshold and as a result of the comparing:
      establishing, using a computing device processor, a case for investigation corresponding to the financial event group, when the financial event group score for the financial event group meets or is above the pre-defined threshold, and
      statistically sampling, using a computing device processor, the financial event groups when the financial event group score for the financial event group is below the pre-defined threshold, wherein statistically sampling further comprises:
         stratifying, using a computing device processor, the financial events within the financial event groups having financial event group scores below the pre-defined threshold into a plurality of subgroups; and
         selecting, using a computing device processor, a financial event from each of the plurality of subgroups as a statistically sampled financial event; and
      applying, using a computing device processor, the statistically sampled financial events as at least a portion of the customer experience data for subsequent scoring processes.

2. The method of claim 1 wherein the scoring of each of events within each of the financial event groups further comprises:
   obtaining, at least in part from a database, using a computing device processor a plurality of predictors including the pre-defined risk factors and the plurality of detection channels;
   collecting, using a computing device processor, training data from stored information regarding existing cases;
   running, using a computing device processor, a logistic regression using the training data to obtain weights for the plurality of predictors; and
   determining, using computing device processor, based on the weights and the predictors, a likelihood of the case for investigation resulting in a suspicious activity report.

3. The method of claim 1 wherein the scoring of the financial events within the financial event group further comprises implementing, using a computing device processor, a decision tree methodology.

4. A computer program product comprising computer-readable program code embodied on a non-transitory computer-readable storage medium, the computer-readable program code executable by a computer system to implement a method of processing financial events, the method comprising:
   detecting a plurality of financial events by receiving data associated with the financial events from a plurality of detection channels, wherein the detection channels include an anti-money laundering system, a financial institution security system and a financial institution accounts system;
   formatting the data for each of the financial events into an event interface record;
   enriching the data corresponding to the plurality of financial events, wherein enriching comprises locating, in at least one database, data elements that are determined to be missing in the event interface record based on key identifiers and adding the data elements to the event interface record;

scoring each of the financial events in each of the financial event groups based on pre-defined risk factors and customer experience data, wherein customer experience data includes transaction history related to one or more customers associated with the financial event, prior suspicious activity report (SAR) history associated with the one or more customers and prior cases investigated associated with the one or more customers; summing the scores of each of the financial events with a financial event group to result in a financial event group score; and comparing the financial event group score to a pre-defined threshold and as a result of the comparing:
establishing a case for investigation corresponding to the financial event group, when the financial event group score meets or is above the pre-defined threshold, and
statistically sampling the financial events when the financial event group score for the financial event group is below the pre-defined threshold, wherein statistically sampling further comprises:
stratifying the financial events within the financial event groups having financial event group scores below the pre-defined threshold into a plurality of subgroups; and
selecting a financial event from each of the plurality of subgroups as a statistically sampled financial event; and
applying the statistically sampled financial events as at least a portion of the customer experience data for subsequent scoring processes.

5. The computer program product of claim 4 wherein the establishing of the case for investigation comprises one of creating a new case and appending to an existing case.

6. The computer program product of claim 4 wherein the scoring of each of events within each of the financial event groups further comprises:
obtaining a plurality of predictors including the pre-defined risk factors and the plurality of detection channels;
collecting training data regarding existing cases;
running a logistic regression using the training data to obtain weights for the plurality of predictors; and
determining, using the weights and the predictors, a likelihood of the case for investigation resulting in a suspicious activity report.

7. The computer program product of claim 4 wherein the scoring of the financial events within the financial event group further comprises using a decision tree methodology.

8. The computer program product of claim 7 wherein the establishing of the case for investigation comprises one of creating a new case and appending to an existing case.

9. A system for processing financial events comprising:
a computing device including a memory and a processor in communication with the memory;
a financial events module stored in the memory, executable by the processor and configured to:
detect financial events by receiving data associated with the financial events from a plurality of detection channels, wherein the detection channels include an anti-money laundering system, a financial institution security system and a financial institution accounts system,
format the data for each of the financial events into an event interface record,
enrich the data corresponding to the plurality of financial events, wherein enriching comprises locating, in at least one database, data elements that are determined to be missing in the event interface record based on key identifiers and adding the data elements to the event interface record,
score each of the financial events in each of the financial event groups based on pre-defined risk factors and customer experience data, wherein customer experience data includes transaction history related to one or more customers associated with the financial event, prior suspicious activity report (SAR) history associated with the one or more customers and prior cases investigated associated with the one or more customers,
sum the scores of each of the financial events with a financial event group to result in a financial event group score; and
compare the financial event group score to a pre-defined threshold and as a result of the comparing:
establish a case for investigation corresponding to the financial event group when a corresponding financial event group score meets or is above a pre-defined threshold, and
statistically sampling the financial events when the financial event group score for the financial event group is below the pre-defined threshold, wherein statistically sampling further comprises:
stratifying the financial events within the financial event groups having financial event group scores below the pre-defined threshold into a plurality of subgroups,
selecting a financial event from each of the plurality of subgroups as a statistically sampled financial event, and
applying the statistically sampled financial events as at least a portion of the customer experience data for subsequent scoring processes;
a first database comprising financial event data connected to the instruction execution platform;
a second database comprising case data connected to the instruction execution platform; and
a third database comprising a datamart connected to the instruction execution platform, wherein the datamart stores the risk factors, the pre-defined threshold, and the customer experience data to enable to instruction execution platform to use the financial event data and the case data.

10. The system of claim 9 wherein the financial events module is further configured to score each of events within each of the financial event groups by:
obtaining a plurality of predictors including the pre-defined risk factors and the plurality of detection channels;
collecting training data regarding existing cases;
running a logistic regression using the training data to obtain weights for the plurality of predictors; and
determining, using the weights and the predictors, a likelihood of the case for investigation resulting in a suspicious activity report.

11. The system of claim 9 wherein the financial events module is further configured to interface with a management of cases application to provide a decision regarding a suspicious activity report for a case.

12. The system of claim 11 wherein the financial events module is further configured to score financial event groups by using a decision tree methodology.

* * * * *